United States Patent
Tilli

(10) Patent No.: US 10,917,347 B2
(45) Date of Patent: Feb. 9, 2021

(54) CONTROL AND USER PLANE ARCHITECTURE

(71) Applicant: Nokia Solutions and Networks Oy, Espoo (FI)

(72) Inventor: Juha-Matti Tilli, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/466,666

(22) PCT Filed: Dec. 22, 2016

(86) PCT No.: PCT/EP2016/082380
§ 371 (c)(1),
(2) Date: Jun. 5, 2019

(87) PCT Pub. No.: WO2018/113973
PCT Pub. Date: Jun. 28, 2018

(65) Prior Publication Data
US 2020/0067836 A1    Feb. 27, 2020

(51) Int. Cl.
*H04L 12/743* (2013.01)
*H04L 12/911* (2013.01)
*H04L 12/861* (2013.01)
*H04L 29/12* (2006.01)

(52) U.S. Cl.
CPC ........ *H04L 45/7453* (2013.01); *H04L 47/821* (2013.01); *H04L 49/90* (2013.01); *H04L 61/103* (2013.01)

(58) Field of Classification Search
None
See application file for complete search history.

(56) References Cited

U.S. PATENT DOCUMENTS

2012/0184282 A1* 7/2012 Malkamaki ........... H04W 48/14
                                                          455/450
2014/0359232 A1* 12/2014 Holbrook ............ G06F 16/2308
                                                          711/147

FOREIGN PATENT DOCUMENTS

EP    2 802 109 A1   11/2014

* cited by examiner

*Primary Examiner* — Jamaal Henson
(74) *Attorney, Agent, or Firm* — Harrington & Smith

(57) ABSTRACT

There is provided a method including acquiring, by a controller of a control interface part, a control plane message requesting an update of a processing thread-specific hash table of a user plane processing thread; providing, by the controller, the message to a queue of the user plane processing thread; obtaining, by the user plane processing thread, the control plane message from the queue; updating, by the user plane processing thread based on the obtained control plane message, the processing thread-specific hash table; indicating, by the user plane processing thread, to the controller that the requested update is processed in response to the updating; obtaining, by the user plane processing thread, at least one user plane message from the queue; and processing, by the user plane processing thread, the at least one user plane message based at least partly on the processing thread-specific hash table.

20 Claims, 6 Drawing Sheets

CONTROL AND USER PLANE ARCHITECTURE

CROSS REFERENCE TO RELATED APPLICATION

This patent application is a U.S. National Stage application of International Patent Application Number PCT/EP2016/082380 filed Dec. 22, 2016, which is hereby incorporated by reference in its entirety.

TECHNICAL FIELD

The invention relates to communications. More particularly, the present invention relates to control and user plane architecture.

BACKGROUND

In a wireless network, division of control plane and user plane may be utilized to logically separate control packets and data packets. However, such architecture utilizing multi-threading may require use of a plurality of locks (e.g. mutex locks) which may cause negative effect on performance of the network. Hence, it may be beneficial to provide solutions that reduce number of locks needed to enhance performance of the network.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

Figure 1:
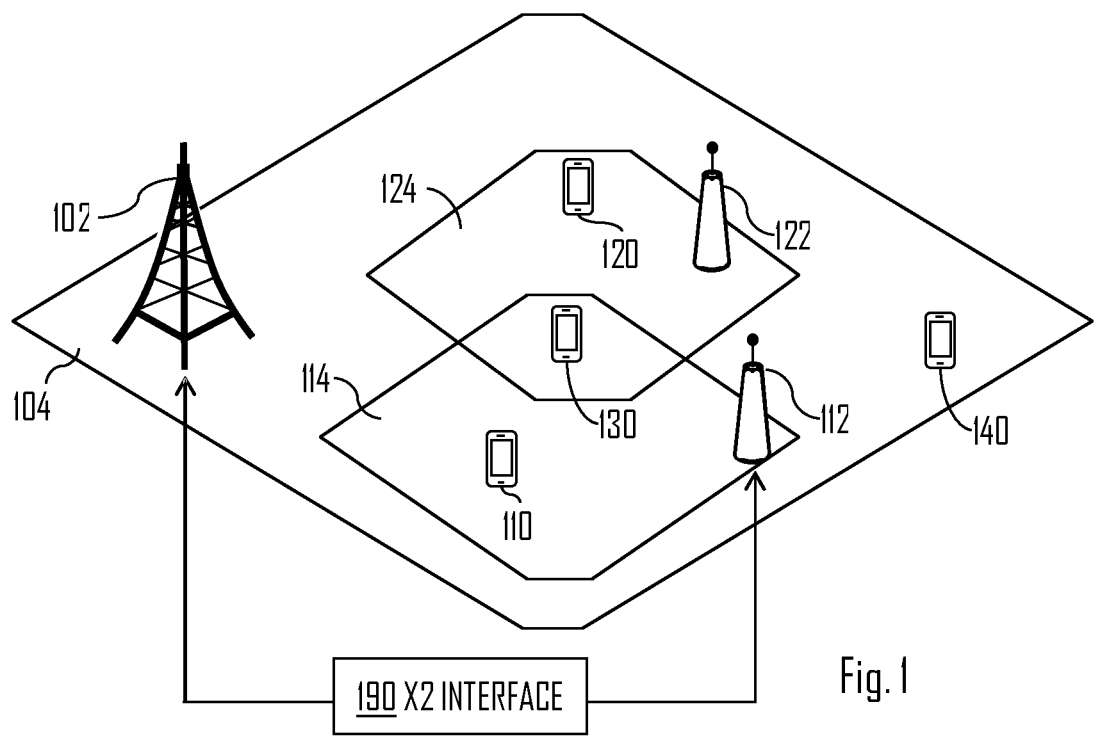
FIG. 1 illustrates an example wireless communication system to which embodiments of the invention may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and/or 5G.

The embodiments are not, however, restricted to the system given as an example but a person skilled in the art may apply the solution to other communication systems provided with necessary properties. One example of a suitable communications system is the 5G concept. 5G is likely to use multiple input-multiple output (MIMO) techniques (including MIMO antennas), many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also it may be integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility. It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE. Some of the functions of the LTE may even be non-existent in the 5G system. Some other technology advancements probably to be used are Software-Defined Networking (SDN), Big Data, and all-IP network, which may change the way networks are being constructed and managed.

FIG. 1 illustrates example of a radio system (also referred to as a cellular communication system or cellular system) to which embodiments of the invention may be applied. Radio communication networks or wireless communication networks, such as the Wireless Local Area Network (WLAN, or WiFi) the Long Term Evolution (LTE), the LTE-Advanced (LTE-A) of the 3$^{rd}$ Generation Partnership Project (3GPP), or the future 5G solutions, are typically composed of at least one network element, such as a network element 102, providing a cell 104. In the example of FIG. 1, cells 104, 114, 124 may be shown. The cell 114 may be provided by a network element 112, and the cell 124 may be provided by a network element 122, for example. The cell 104 may be provided by the network element 102. It is, however, possible that a network element of the radio system may provide more than one cell. Thus, for example, the network element 102 may provide the cell 104, the cell 114, and/or the cell 124. In general, the system may comprise one or more network elements (similar to those described with reference to FIG. 1), wherein each network element provides one or more cells providing service to one or more terminal devices in the cells.

Each cell of the radio communication network may be, e.g., a macro cell, a micro cell, a femto, or a pico-cell, for example, meaning that there may be one or more of each of the described cells. Each network element of the radio communication network, such as the network elements 102, 112, 122, may be an evolved Node B (eNB) as in the LTE and LTE-A, a radio network controller (RNC) as in the UMTS, a base station controller (BSC) as in the GSM/GERAN, Access Point (AP), or any other apparatus capable of controlling radio communication and managing radio resources within a cell. That is, there may be one or more of each of the described apparatuses or entities. To give couple of examples, the network element 102 may be an eNB, for example. The network element 112 may also be an eNB. For example, network element 102 may provide a macro cell and the network element 112 may provide a micro cell.

For 5G solutions, the implementation may be similar to LTE-A, as described above. The network elements 102, 112, 122 may be base station(s) or a small base station(s), for example. In the case of multiple eNBs in the communication network, the eNBs may be connected to each other with an X2 interface 190 as specified in the LTE. Example of this may be shown in FIG. 1, wherein the network element 112 may be shown to be connected to the network element 102 via the X2 interface 190. Other communication methods between the network elements may also be possible. For example, APs of WLAN system may communicate with each other. At least some of the network elements 102, 112, 122 may be further connected via an S1 interface to an evolved packet core, more specifically to a mobility management entity (MME) and to a system architecture evolution/serving gateway (SGW). So in general, the network elements of FIG. 1 may be communicatively connected (wireless and/or wired) to each other using one or more circuitries. The X2 interface 190 is one example of how to realize such communication.

The cells 114, 124 may also be referred to as sub-cells or local area cells, for example. The network elements 112, 122 may be referred to as sub-network elements or local area access nodes, for example. The cell 104 may be referred also to as a macro cell, for example. The network element 102 may be referred to as a macro network element, for example. In an embodiment, the local area access nodes are network elements similar to the network element 102. Thus, for example, the local area access node 112 may be an eNB or a macro eNB.

The cells 104, 114, 124 may provide service for at least one terminal device 110, 120, 130, 140, wherein the at least one terminal device 110, 120, 130, 140 may be located within or comprised in at least one of the cells 104, 114, 124. The at least one terminal device 110, 120, 130, 140 may communicate with the network elements 102, 112, 122 using communication link(s), which may be understood as communication link(s) for end-to-end communication, wherein source device transmits data to the destination device. It needs to be understood that the cells 104, 114, 124 may provide service for a certain area, and thus the at least one terminal device 110, 120, 130, 140 may need to be within said area in order to be able to use said service (horizontally and/or vertically). For example, a third terminal device 130 may be able to use service provided by the cells 104, 114, 124. On the other hand, fourth terminal device 140 may be able to use only service of the cell 104, for example.

The cells 104, 114, 124 may be at least partially overlapping with each other. Thus, the at least one terminal device 110, 120, 130, 140 may be enable to use service of more than one cell at a time. For example, the sub-cells 114, 124 may be small cells that are associated with the macro cell 104. This may mean that the network element 102 (e.g. macro network element 102) may at least partially control the network elements 112, 122 (e.g. local area access nodes). For example, the macro network element 102 may cause the local area access nodes 112, 122 to transmit data to the at least one terminal device 110, 120, 130, 140. It may also be possible to receive data, by the network element 102, from the at least one terminal device 110, 120, 130, 140 via the network elements 112, 122. To further explain the scenario, the cells 114, 124 may be at least partially within the cell 104.

The at least one terminal device 110, 120, 130, 140 may comprise mobile phones, smart phones, tablet computers, laptops and other devices used for user communication with the radio communication network. These devices may provide further functionality compared to the MTC schema, such as communication link for voice, video and/or data transfer. However, it needs to be understood that the at least one terminal device 110, 120, 130, 140 may also comprise Machine Type Communication (MTC) capable devices, such as sensor devices, e.g. providing position, acceleration and/or temperature information to name a few examples.

Moore's law will have doubled between 2000 and 2020 computer's central processing unit (CPU) transistor count ten times and thus performance has increased 1024-fold or approximately 1000-fold. This may sound great, but one needs to consider how computer network performance has increased at the same time. In 2000, the data rate order of magnitude for Internet connections was about 100 kbit/s offered by general packet radio service (GPRS) and landline modems. In the future, the fifth generation (5G) is expected to offer 10 Gbit/s mobile connectivity, or about 100,000 times faster than in 2000. At the same time, when computer network performance has increased 100,000 times, packet size has stayed relatively constant. This means that it will be approximately 100 times harder to satisfy the performance requirements in the future. Also, per-core performance in computer CPUs has practically saturated. Minor gains are possible, but major gains are expected to occur only in CPU core count. Today, therefore one may need to have a multi-threaded architecture to obtain needed performance.

Multi-threading, however, may have inherent costs. For example, mutex locks are expensive. One possibility is the use of lock-free algorithms employing atomic operations, but lock-free algorithms has no way to sleep if no packets are available in an interruptible manner. Thus, energy is consumed at great rate if lock-free algorithms are used in an idle system. Therefore, it is desirable to use mutexes for locking and condition variables for sleeping, even though mutex lock cost is high and condition variable sleep cost is even higher.

It is common to utilize division of control plane and user plane in cellular communication systems. For example, a user plane and a control plane may be utilized. User plane (sometimes referred to as forwarding plane, carrier plane or bearer plane) may be used to carry user network traffic, e.g. data packets transmitted from and to terminal devices. Examples of such data packets may be voice packet, cellular data packet and text message data packet. The control plane on the other hand carries signaling traffic. Control packets may be used to configuration purposes, for example. The user and control planes may utilize same physical connection, but can be understood as separate logical connections, as it is known by the skilled person. Example of such division of control plane and user plane may be seen in FIG. 2.

Figure 2:
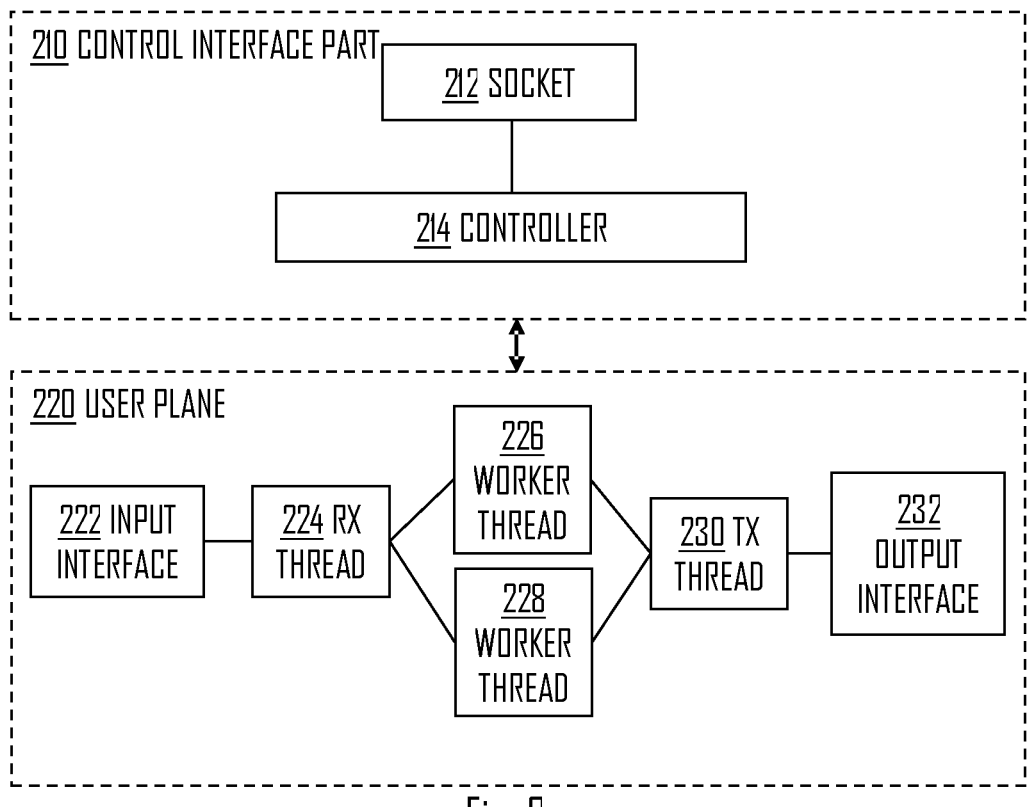
FIG. 2 illustrates an example of division of control plane and user plane.

Referring to FIG. 2, the system may comprise a control interface part 210 and a user plane 220. The control interface part 210 may comprise a socket 212 and a controller 214. The socket 212 may be utilized to receive and transmit messages. For example, the control interface part 210 may be connected to an MME via the socket 212, and thus the controller 214 may acquire control messages from the MME. That is, the control interface part 210 may be understood as a control interface to access control plane. In a way, the control interface part can be understood as a part that provides communication capabilities between the user plane entities and the control plane. Thus, in some embodiments, the control interface part 210 can be understood as a part of the user plane 220 enabling the user plane 220 entities to receive control message from the control plane. On the other hand, said interface may enable sending messages to the control plane by the user plane entities. In some instances, the controller of the control plane part 210 can be referred to as a controller comprising one or more threads.

The user plane 220 may comprise a plurality of processing threads 224-230 (may simply be referred to as threads). Said threads may each have a dedicated processing function. For example, RX thread 224 may be configured to receive data packets via the input interface 222 and to convey the data packets to the worker threads 226, 228. The worker threads 226, 228 may be configured to process the data packets, based at least partly, on a hash table. The TX thread 230 may be responsible for outputting data packets via the output interface 232. The input and output interfaces 222, 232 may be a part of a network adapter enabling communication to other entities of a wireless network. As discussed above, the socket 212 and the interfaces 222, 232 may utilize same physical connection, but may control logically separate connections. Thus, for example, each of the socket 212, interface 222, and interface 232 may be associated with a specific logical connection or connections.

As was shortly discussed above, the problem arising in such systems is that number of locks (e.g. mutex locks) decreases processing capability of the system. E.g. when the control interface part 210 performs an update on the hash table of the user plane 220 (i.e. based on the update request from the control plane), the processing by the worker threads 226, 228 may be stopped as the hash table is locked by the control interface part 210. Locking may mean that the locked entity (e.g. queue or hash table) cannot be used by other entities of the system. This may mean that the capability, by the system, to process many packets per second decreases. Therefore, in general, there is provided a solution to reduce number of locks required in a wireless network system utilizing the division of control plane and user plane. One aspect of this solution relates to the communication between the control interface part 210 and the user plane 220. Some other aspects may specifically relate to the user plane 220.

Figure 3:
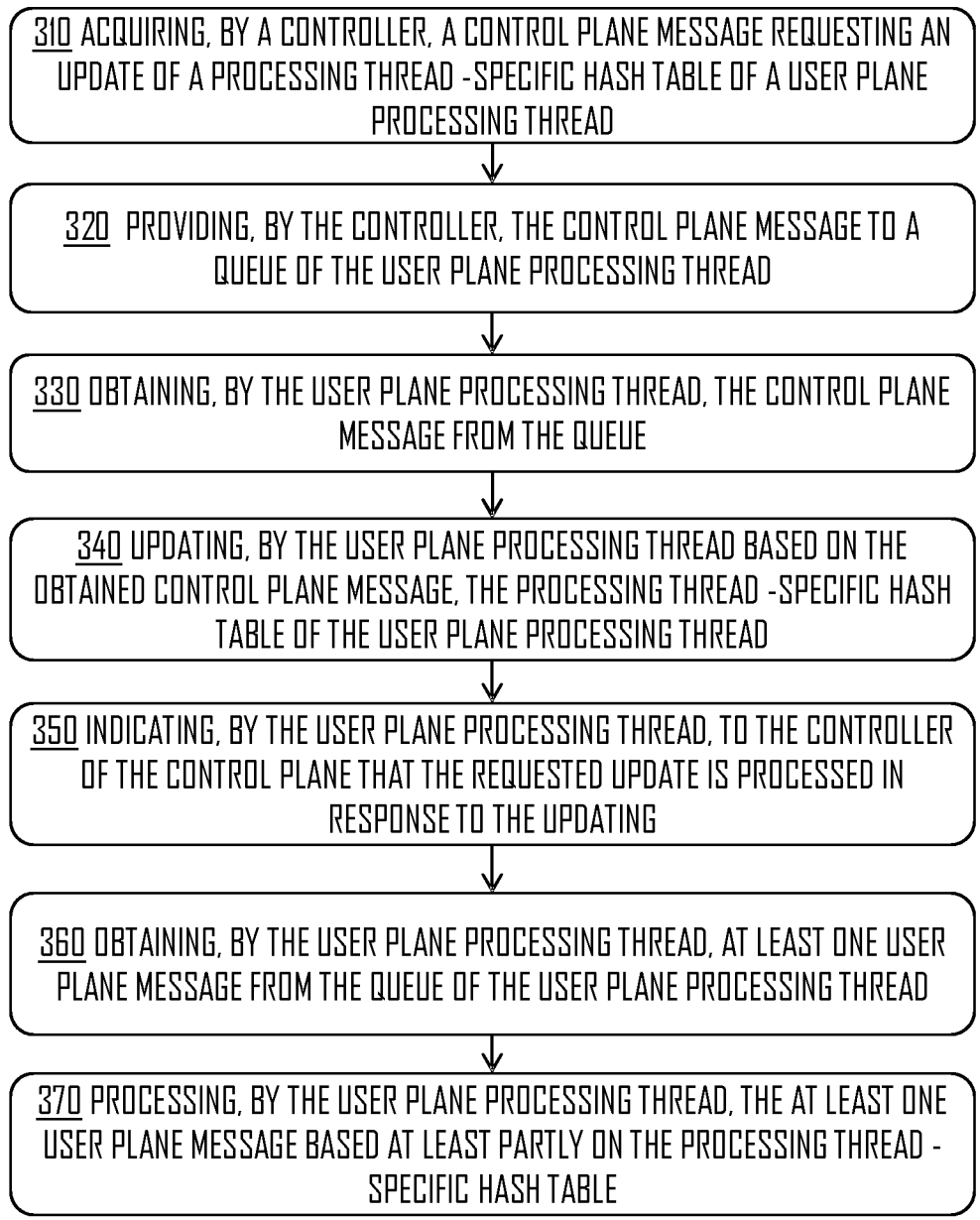
FIG. 3 illustrates a flow diagram according to an embodiment.

FIG. 3 illustrates a method according to an embodiment. The method may comprise the following steps: acquiring, by a controller of a control interface part, a control plane message requesting an update of a processing thread-specific hash table of a user plane processing thread (block 310); providing, by the controller, the control plane message to a queue of the user plane processing thread (block 320); obtaining, by the user plane processing thread, the control plane message from the queue (block 330); updating, by the user plane processing thread based on the obtained control plane message, the processing thread-specific hash table of the user plane processing thread (block 340); indicating, by the user plane processing thread, to the controller of the control interface part that the requested update is processed in response to the updating (block 350); obtaining, by the user plane processing thread, at least one user plane message from the queue of the user plane processing thread (block 360); and processing, by the user plane processing thread, the at least one user plane message based at least partly on the processing thread-specific hash table (block 370).

The described method of FIG. 3 may be suitable for the system of FIG. 2, for example. Said controller may be or be comprised in the controller 214. Said user plane processing thread may be one of the worker threads 226. However, said user plane processing thread may comprise TX thread 230 and/or RX thread 224. This may happen, for example, if the RX thread 224 is configured to also process the received messages based on the hash table. Thus, said user plane processing thread may have more than one function (e.g. RX, TX and/or worker function).

The benefit of the described solution is that, by using the thread specific hash table, the hash table update (i.e. control message) does not stop the processing by the other threads of the user plane 220. Thus, the control message from the control interface part 210 to the thread of the user plane 220 may be inputted into the queue (e.g. work queue) of the thread. The thread may then obtain the update request from its queue, and process the update accordingly. Hence, other threads of the system are not adversely affected, and consequently the packet processing rate of the system may increase.

The described solution may be especially beneficial for cellular communication systems. However, the described solution may be applicable to any system utilizing division of control plane and user plane (i.e. at least a control plane and a user plane). Thus, for example, the solution may be utilized in a wireless system, such as in WLAN system. Also, the solution may be applicable to non-wireless solutions, such as routers (e.g. Internet router). It is further noted that the thread may be comprised in a processing core, wherein the processing core supports or implements one or more threads. Thus, the multi-threading may be accomplished by using one or more processing cores.

Figure 4A:
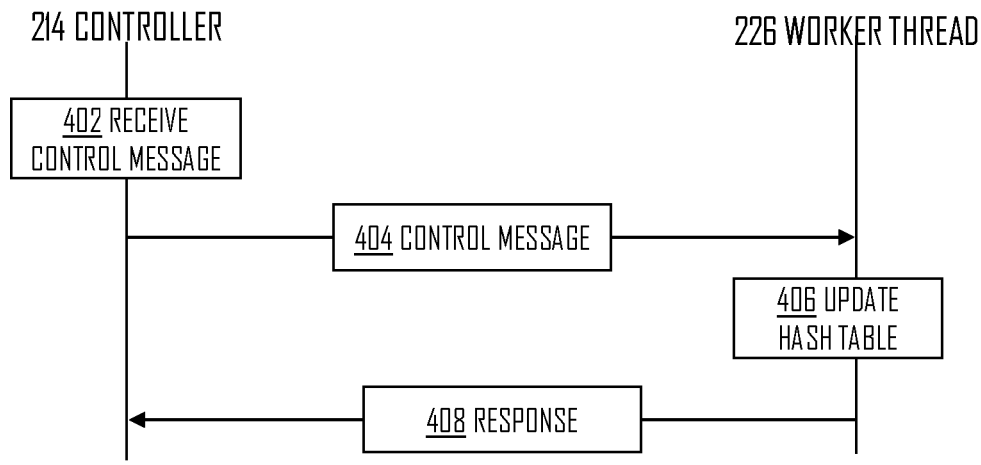
FIGS. 4A to 4C illustrate some embodiments.
Figure 4B:
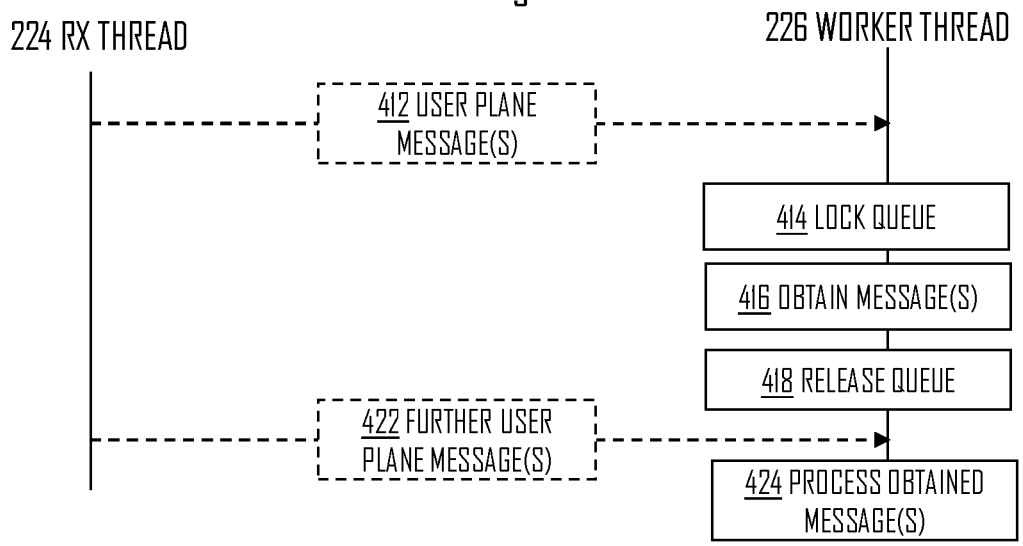
Figure 4C:
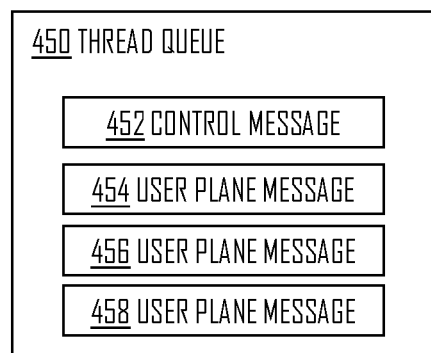

Let us then look a bit closer on some examples and embodiments. FIGS. 4A to 4C illustrate some embodiments. Referring first to FIG. 4A, the communication between the controller 214 and the processing thread may be shown. In this example, the processing thread is a worker processing thread 226. For example, the worker thread 226 may perform practically all message processing required, including checksum calculation and tunnel lookup. In case of Address Resolution Protocol (ARP) message, the worker thread 226 may perform lookup using per-thread tunnel and ARP data structures. It is further noted that control message(s) and user plane message(s) may denote control plane packet and user plane packet respectively. In general, a message may comprise one or more data units representing a packet (e.g. data packet carrying user plane data or control plane data).

So the controller 214 may receive the control message (block 402). This may happen via the socket 212, for example. The control message may request update of a thread-specific hash table. The controller 214 may transmit the control message to a worker thread 226 that is associated with the update request (block 404). In some cases, the control message is transmitted to more than one worker thread. This may happen, if the update is relevant to more than one worker thread. The control message may be transmitted to the worker thread 226 via a queue of the worker thread 226. I.e. the controller 214 inputs the control message to the queue, and the worker thread 226 then picks up the control message from the queue. Before the inputting, the controller 214 may lock the queue. After the control message has been inputted, the queue may released such that the worker thread 226 may in turn lock the queue and obtain the control message from the queue. The queue may then once again be released, enabling the controller 214 to input further control message(s), and enabling input of user plane messages to said queue. The queue may be specific for the worker thread 226. That is, the queue may only be used by the worker thread 226 and not by other worker threads. The worker thread 226 may then update its hash table based on the control message (block 406). Further, the worker thread 226 may transmit a response to the controller indicating that the update has been initiated or performed (block 408). The response may be transmitted, for example, via a queue of the controller in a similar manner as the control message. I.e. before input of the response message, the queue of the controller may be locked and released once the response message has been inputted. The controller may then lock the queue, obtain the response message and release the queue. In a similar way, other messages from the worker thread 226 may be transmitted to the controller 214.

Let us consider an update request which relates to adding a path to the hash table of the worker thread 226. The controller 214 may comprise an input thread and output thread:

Controller input thread picks up "add path request" from the control plane. The controller may receive said request from the control plane via the socket 212 or similar communication enabling interface.

Controller input thread may validate the request.

Controller input thread may update the global locked hash tables based on header values (e.g. Tunnel Endpoint Identifier (TEID) and Internet Protocol (IP)). Global hash table(s) may be accessed by the entities of the user plane, for example. When accessing the global hash table, the entity (e.g. thread) may need to first lock the global hash table as it may be used by plurality of entities. Once the required information is attained, the global hash table may be unlocked, and thus may once again be used by other entities in a similar manner.

Controller input thread may enqueue "the add path request" (e.g. add TEID or add IP) to queue of the worker thread.

Controller input thread may wait for the worker thread to process the message.

Worker thread picks up the "add path request" message and updates its local hash table.

Worker thread notifies the controller input thread.

Control interface input thread receives the notification and frees the message.

Controller input thread constructs a reply and enqueues in to the controller output thread.

Controller output thread picks up the reply and sends it to the control plane (e.g. via the socket 212).

"Delete path request" and "modify path request" may be implemented in a similar way. That is, an entry or entries in the local hash table may be entered, deleted or modified (i.e. local has table may be updated). The local hash table may denote the thread specific hash table.

It is further noted that the request may relate to both updating of IP address and TEID. That is in such case, the control message is enqueued to queue of a worker thread handling downlink with respect to updating IP. Further, the control message is enqueued to queue of a worker thread handling downlink with respect to updating TEID. The worked thread 226 may in some embodiments be responsible for uplink messages and downlink messages. Thus, it may update both TEID and IP. However, in some instances the worker thread 226 may be configured to handle uplink or downlink messages. Thus, it may be only requested to update IP address or TEID.

Referring to FIG. 4B, the worker thread 226 may lock its queue (block 414); obtain at least one user plane message during said queue being locked (block 416); and release said queue in response to the obtaining of the at least one user plane message (block 418). In block 424, the worker thread 226 may process the obtained at least one message. As described in case the worker thread 226 performs some other functions of the user plane 220, the described steps may generally be performed by a user plane processing thread.

In an embodiment, the at least one user plane message denotes a plurality of user plane messages. This may mean that the expression used to indicate the at least one user plane message actually means that there are more than one user plane message. Thus, the at least one user plane message may comprise a plurality of user plane messages in some embodiments. So, the worker thread 226 may obtain more than one user plane message with the same operation. This may reduce number of locking operations needed. For example, all messages from the queue may be obtained by locking it once and then releasing the queue once all messages from said queue are obtained.

Still referring to FIG. 4B, the RX thread 224 may be configured to obtain the at least one message via the input interface 222. Each message may comprise a header field. The RX thread may determine to which worker thread the message is to be conveyed to, based on the header field of the message (i.e. user plane message). The header field may indicate TEID, IP address or terminal device identifier, for example. Thus, the RX thread 224 may convey the at least one message to the worker thread 226 (block 412) in the example of FIG. 4B. This may mean that the RX thread 224 inputs the at least one message to the queue of the worker thread 226. Said queue may thus comprise one or more user plane messages. Once the queue is locked by the worker thread 226, the RX thread 224 may not input further message(s) to the queue. However, the RX thread 224 may input further messages once the queue is once again released (block 422). Inputting the message to the queue may require locking the queue by the RX thread 224. It is also noted that as the controller 214 may input control messages to the same queue, there may be instances when the queue comprises one or more user plane messages and one or more control plane messages. However, the queue may at some instances be empty or comprise only control message(s) (i.e. control plane message) or user plane message(s).

Additionally, but not always, the worker thread 226 may transmit the at least one message to the TX thread 230 associated with the worker thread 226. This may once again happen via a queue, i.e. queue of the TX thread 230. The TX thread 230 may obtain the at least one message from its queue and cause them to be transmitted via the output interface 232.

One aspect of the proposed solution may be to further reduce number of locks (e.g. mutex locks) needed in the described system. Let us thus consider flow of an ordinary user plane message in the system of FIG. 2. Once the RX thread 224 receives the message (i.e. user plane message), the system may allocate memory for said message. Memory may be allocated from a thread-local heap for messages, and potentially multiple messages are received in one operation. If the thread-local heap becomes empty, it may be filled to approximately half level from the global heap, locking the global heap mutex only once. Thus, the cost of locking may be amortized over many packets by obtaining a plurality of messages in one operation instead of a plurality of operations (i.e. one operation per message). Heap may mean a data storage entity (e.g. a temporary data storage location). It may be used to store pre-allocated blocks, for example.

After receiving the one or more messages, they may be enqueued to a blocking queue of a worker thread (e.g. 226 or 228) in one operation, locking the blocking queue mutex only once. Thus, the cost of locking may be amortized over many messages. The worker thread may be chosen (by the RX thread 224) by taking a hash value from flow-identifying header fields of the message. Note that one RX thread may send on or more of a plurality of obtained messages to one worker thread and one or more of the plurality of obtained messages to another thread. E.g. if the heap of the RX thread 224 has 100 messages, 55 may be send to worker thread 226 and 45 may be send to worker thread 228. There may naturally be more than two worker threads and thus the received messages may be distributed differently. The distribution may be performed based on the header field of the message, as explained above.

Moving on, the worker thread (e.g. 226) may dequeue one or more messages (potentially more than one) from the blocking queue. Thus, the cost of locking may be amortized over many messages. The worker thread may then, for each message, look up flow information from a thread-local flow data structure (also referred to as a hash table). The thread-local data structure, being thread-local, may not need locks as it may be updated only by the respective worker thread. The worker thread may obtain MAC address associated with a processed message based on the thread-local data structure. E.g. Ethernet MAC address may be obtained by looking up the IP address in the thread-local ARP table. This table, being also thread-local, may not need locks either.

Further, the worker thread may then enqueue a plurality of messages to the TX thread 230. Each worker thread may use the same TX thread, so the number of transmit threads may be equal to or less than the number of worker threads. By inputting the plurality of messages to the TX thread blocking queue, cost of locking may be amortized over the plurality of messages.

The transmit thread 230 may then dequeue a plurality of messages from its blocking queue, amortizing the cost of locking. The transmit thread may then transmits the messages, possibly using only one system call, and then frees message data to a thread-local heap (i.e. associated with a specific TX thread), which does may not require locks. If the thread-local heap becomes full, it may be halved by moving half of its elements to the global heap (same for a plurality of TX threads), locking mutex only once in the operation. So, the halving operation may amortize the cost of locking the mutex over many messages.

Let us then refer to FIG. 4C, illustrating an embodiment in which user plane messages 454-458 have a lower priority compared with control plane messages 452 in the queue of the user plane processing thread. Specifically, such solution may be suitable for the queues of the worker threads 226, 228. This may mean that if the queue has at least one control message 452, the worker thread 226 may process the at least one control message 452 before continuing to process the user plane messages 454-458. In other words, the control plane messages may have a higher priority than the user plane messages.

In an embodiment, the user plane processing thread is an uplink processing thread processing only uplink user plane messages. In an embodiment, the user plane processing thread is a downlink processing thread processing only downlink user plane messages. For example, with reference to FIG. 2, the worker thread 226 may be an uplink thread and the worker thread 228 may be a downlink thread 228.

In an embodiment, the user plane 220 comprises a plurality of processing threads, each processing thread associated with a processing thread-specific hash table. This may mean that at least each worker thread 226, 228 is associated with a thread specific hash table.

In an embodiment, the user plane 220 comprises one or more downlink processing threads and one or more uplink processing threads. Hence, there may be a plurality of downlink worker threads configured to process downlink data packets or messages and a plurality of uplink worker threads configured to process uplink data packets or messages.

Figure 5A:
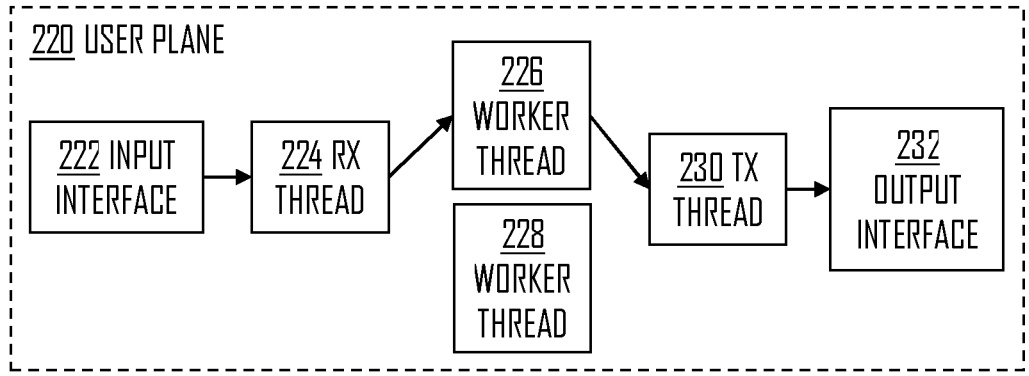
FIGS. 5A to 5B illustrate some embodiments.
Figure 5B:
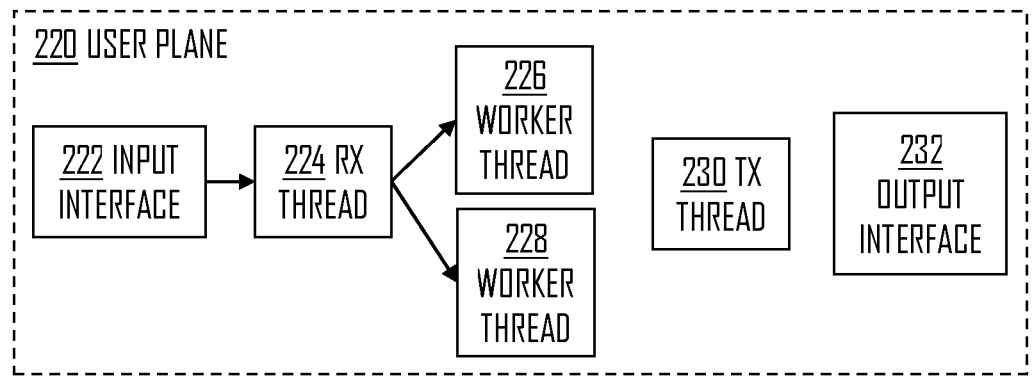

Let us then look at the embodiments of FIGS. 5A and 5B. FIG. 5A may illustrate an example of a flow of a user plane message that is not an ARP message. FIG. 5B may illustrate an example of a flow of a user plane message that is an ARP message. Referring first to FIG. 5A, the flow of the message may be as described already above. That is, the RX thread 224 may obtain the message via the input interface 222. The RX thread 224 may determine to which worker thread it needs to convey the message to. In the example of FIG. 5A, the message is transmitted to the worker thread 226. The worker thread 226 may process the message. Possibly the worker thread 226 may further convey the processed message (e.g. based on the hash table determination) to the TX thread 230 which may transmit the message via the output interface 232.

However, in the case of ARP message (i.e. the obtained, by the RX thread, message or messages are ARP messages), the RX thread 224 may convey the ARP message to each worker thread 226, 228. In other words, it may copy the ARP message to queue of each of the worker threads 226, 228, wherein there may be a plurality of worker threads. Thus, each worker thread 226, 228 may update its thread specific ARP table.

Hence, in an embodiment, the RX thread 224 determines whether obtained user plane message is an ARP message or some other message. In the case of the ARP message the RX thread 224 may provide or input the ARP message to a queue of each of the plurality of worker processing threads (e.g. to queue of the worker thread 226 and to queue of the worker thread 228), otherwise the RX thread 224 may provide or input said message only to a queue of a target worker processing thread (e.g. thread 226 in the example of FIG. 5A). In other words, in case of ARP message or messages, the RX thread 224 may clone the ARP message a number of times corresponding to the number of worker threads 226, 228. So, if there are four worker threads, four copies of the ARP message may be generated. Accordingly, the ARP message is then provided to a queue of each worker thread so that all worker threads may acquire the ARP message from their respective queues and update their ARP tables. The ARP tables may be thread specific, i.e. each worker thread may have its own ARP table. In case of ARP messages, the worker threads 226, 228 may not necessarily convey the ARP messages forward as the ARP messages relate to the updating of the worker thread ARP tables. It needs to be noted that the hash table of the worker processing thread may comprise the ARP table, IP address table and/or TEID table.

According to an embodiment, the user plane 220 comprises a plurality of worker processing threads 226, 228. The RX thread 224 may obtain one or more a user plane messages, and provide said one or more user plane messages to a queue of at least one target worker processing thread of the plurality of worker processing threads. E.g. in case of ARP message, the target worker processing thread comprises all worker threads. E.g. in case of non-ARP message, the target worker processing thread may be only one worker processing thread. It further needs to be noted that in some embodiments, the user plane or the system comprises a plurality of RX threads (e.g. similar as RX thread 224) each capable of conveying the received messages. Similarly, in an embodiment, the user plane or the system comprises a plurality of TX threads (e.g. similar as TX thread 230). Thus, in some embodiments, the system comprises a plurality of RX threads, a plurality of TX threads and a plurality of worker threads.

Figure 6:
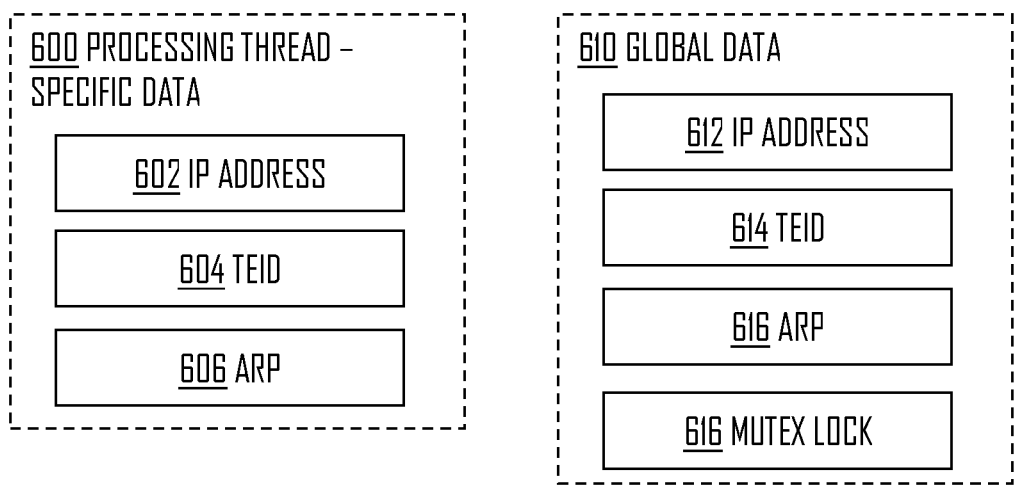
FIG. 6 illustrates an embodiment.

FIG. 6 illustrates some embodiments. Referring to FIG. 6, processing thread-specific data structure 600 may be shown. Depending on the worker thread, the worker thread-specific data structure 600 may comprise IP address based hash table 602, TEID based hash table 604 and/or ARP table 606. That is, IP based hash table 602 may be utilized if the worker thread is configured to process downlink messages (i.e. downlink data packets). TEID based hash table 604 may be utilized if the worker thread is configured to process uplink messages (i.e. uplink data packets). As already indicated one worker thread may have one of the described (if dedicated downlink or uplink thread) or both if the worker thread is configured to process both downlink and uplink messages. ARP table 606 may be used to map the TEID and/or IP address based hash table(s) to MAC addresses. The hash table as described above may thus comprise IP address based hash and/or TEID based hash.

It needs to be noted that the IP address based hash table 602 may comprise both IP address(es) and TEID(s). Similarly, the TEID based hash table 604 may comprise both IP address(es) and TEID(s). ARP table may include IP address to MAC address mapping.

FIG. 6 further illustrates a global data structure 610. The global data structure 610 may be utilized by the controller 214, for example. That is, when the controller acquires the control message that requests update of TEID or IP, the control message may be conveyed to the worker thread associated with said request. Further, in an embodiment, the controller 214 may update the global data based on the control message. The global data may logically be located at the control interface part 210. The global data structure may thus comprise IP address based hash table 612, TEID based hash table 614, ARP table 616 and also a lock (e.g. mutex lock) 616, which may be used to lock the global data structure 610 when it is updated by the controller 214.

Figure 7A:
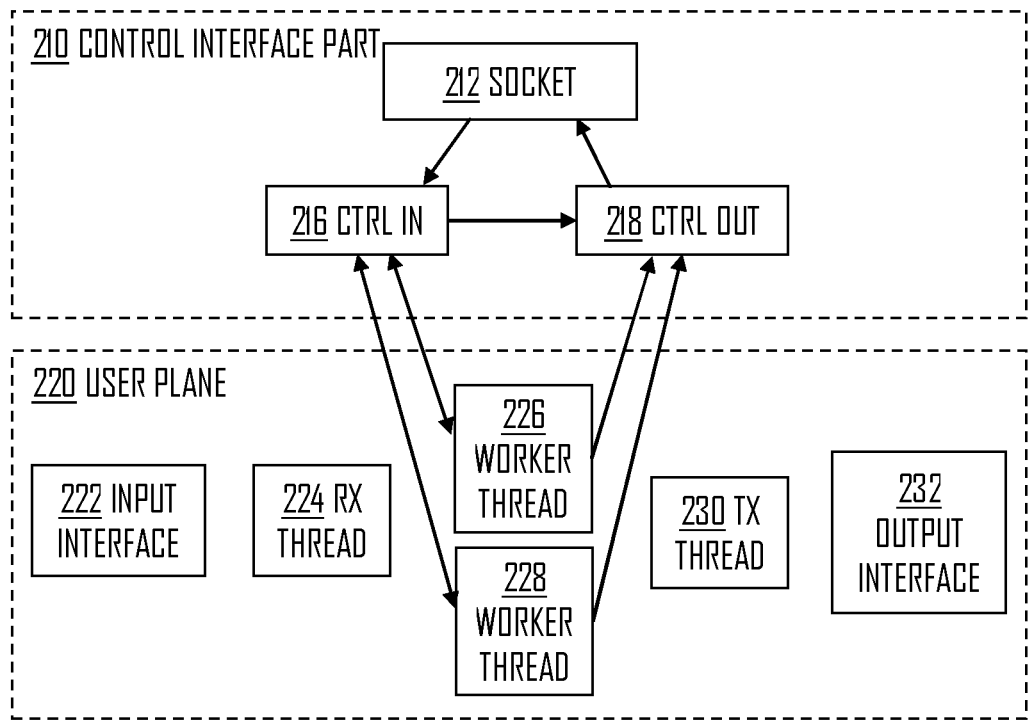
FIGS. 7A to 7B illustrate some embodiments.
Figure 7B:
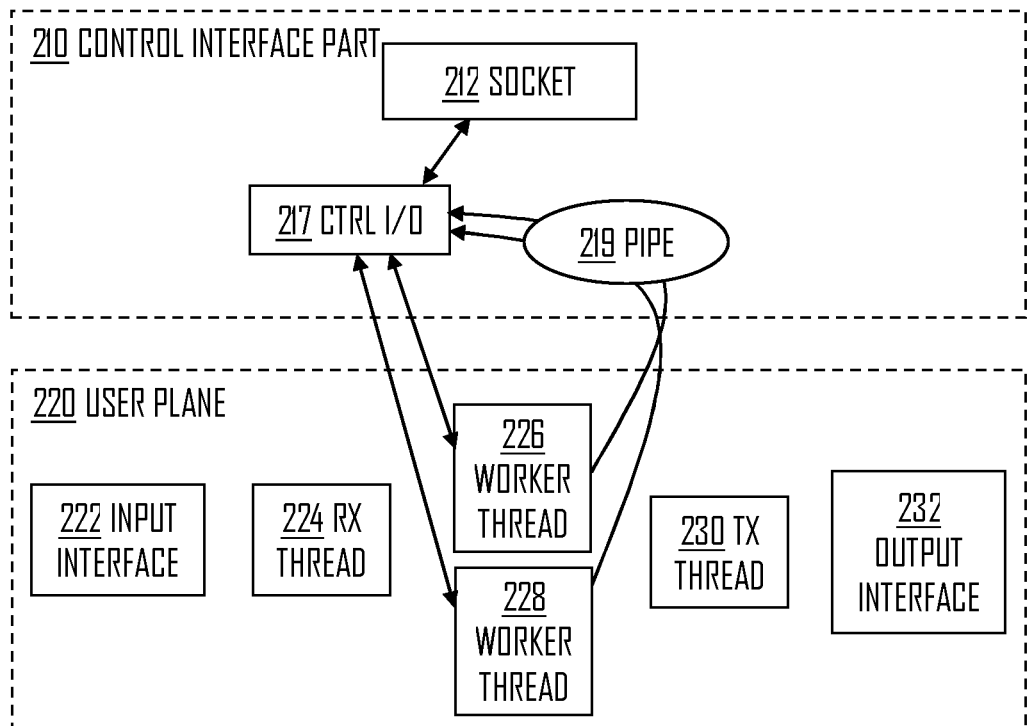

FIGS. 7A to 7B illustrate some embodiments. In an embodiment, the user plane processing thread (i.e. the worker thread 226 or 228) provides the response message to a queue of the controller 214, the response message indicating that the update requested by the control plane message is processed. The controller 214 may acquire the response message from said queue. Thus, the controller 214 may become aware that the update response (i.e. update of the hash table) has been processed or at least initiated by the worker thread. In the example of FIG. 7A, the response message is inputted into a queue of an input thread 216 of the controller (CTRL). Thus, the input thread 216 may acquire the response from the queue. The queue may be a blocking queue. Further, the input thread may indicate the response to the output thread 218 of the controller. The output thread 218 may further indicate the response to an external entity (e.g. MME) via the socket 212. The communication between the input and output threads 216 is, in an embodiment, one-way communication (i.e. unidirectional) from the input thread 216 to the output thread 218. Communication between the socket 212 and the input thread 216 may also be unidirectional as indicated by the arrow. Also, communication between the output thread 218 and the socket 212 may be unidirectional as indicated by the arrow.

Thus, in an embodiment, the controller 214 comprises an input processing thread 216 and an output processing thread 218. Example of this is shown in FIG. 7A, but two or more threads at the controller 214 may be utilized in different situations also.

In an embodiment, with reference to FIG. 7B, the controller 214 acquires the control plane message from the socket 212, wherein the user plane processing thread (e.g. worker 226, 228) provides the response message to the controller 214 indicating that the update, requested by the control plane message, is processed, wherein the response message is provided via a pipe 219 of the control plane, and wherein the pipe 219 and the socket 212 support multiplexing. Alternatively, the pipe 219 could be replaced by a socket that is similar to the socket 212. In the example of FIG. 7B, only one thread 217 is shown. However, the control interface part 210 may have more than one thread in some embodiments. However, using the pipe or a socket as means to receive messages from the worker threads 226, 228 may not necessarily require a specific output thread 218 as the messages from the socket 212 and from the pipe 219 (or socket) may be multiplexed. The thread 217 may be configured to perform input and output operations (i.e. input messages to the user plane and to output messages via the socket 212 to external entities).

It also needs to be noted that other messages than response messages may be sent from the user plane (i.e. the worker threads 226, 228) to the controller 214 via the pipe 219 (or socket) or via the queue(s) (described with respect to FIG. 7A). For example, to allow user plane 220 to trigger control plane operations such as charging events, it is possible to split the control interface thread (e.g. the controller 214) to two: an input thread 216 and an output thread 218 having a blocking queue inbetween. The user plane thread (e.g. the worker thread 226, 228) may enqueue data or messages to the queue. Such system may be shown in FIG. 7A. Another possibility is to use a non-blocking input/output (I/O) multiplexer in the control interface thread (e.g. the thread 217 in FIG. 7B), so that user plane thread (e.g. the worker thread 226, 228) may trigger control plane operations by sending a message to a UNIX pipe (e.g. the pipe 219 or a socket), which is part of the non-blocking I/O multiplexing. The pipe 219 and the socket 212 may be understood as kernel-level queues. I.e. they may be core functions of a UNIX system, for example. In some embodiments, socket denotes an interface.

Let us consider the pipe 219 a bit further. That is, instead of using a blocking queue to enable communication from the user plane to the control plane, the communication from user plane to control plane may use a pipe. The pipe may be a file descriptor (e.g. similar as the socket 212), and thus, the select( )/poll( )/kqueue( )/epoll( ) system calls or /dev/poll may support multiplexing traffic from pipe and socket. The control plane thread 217 may implement a non-blocking I/O multiplexer using select( )/poll( )/kqueue( )/epoll( ) or /dev/poll. Whenever a user plane thread (e.g. 226, 228) needs to trigger a control plane operation, it may enqueue a message to the control plane output thread (e.g. the thread 217 or in some cases the output thread 218 if more than one thread is used at the controller 214) via its pipe. However, communication in the other direction (from control plane to user plane) may still utilize blocking queues. The advantages of the pipe-based architecture may be numerous:

- It has clean architectural design. The file descriptor related to control plane may be handled from control plane threads (i.e. threads of the control interface part 210).
- It allows user plane to trigger control plane operations (e.g. charging events) and not only to be the target of control plane operations. However, in some other embodiments, the pipe may be replaced by using blocking queue(s).
- The inherent buffering in the pipe means that slight slowdowns in e.g. Transmission Control Protocol (TCP) connection performance may not immediately slow down user plane packet processing.
- User plane performance may be excellent, because user plane uses blocking queues implemented on top of thread synchronization primitives, and thus does not need system calls. System calls may not be needed as the user plane threads may communicate with each other by using the thread synchronization primitives that don't internally use system calls. Using a pipe (e.g. pipe 219) may require a system call.

Let us then further consider the blocking queue between the controller 214 and the worker threads 226, 228, wherein the blocking queues may be used to convey messages from the control plane to the user plane. As discussed earlier, the blocking queues between the control interface part and the worker threads may have two priorities. There may be at least one separate control interface thread 216 receiving data from a control interface connection (e.g. the socket 212). The control interface thread 216 may send a high-priority update request to the blocking queue of the worker thread (e.g. 226 or 228) having a flow data structure. The update may contain (1) a mutex, (2) a condition variable, (3) a flag initially set to zero and (4) update information. The worker thread 226, 228 may signal the control interface thread 216 by using the condition variable and the flag that update has been processed. The control interface thread 216 may wait on the condition variable and the flag. When the control interface thread 216 receives notification that update has been processed from the worker thread 226, 228, it may free the data structure and reply to the control interface connection (e.g. socket 212) that the update has been now processed.

It is noted that uplink and downlink of the same flow may be hashed to different worker threads. For example, in uplink a user plane gateway (UGW) knows the tunnel endpoint identifier (TEID) and in downlink the IP address. The hash from TEID may result in a different value than the hash from IP address. Once an uplink packet is received (e.g. from an eNodeB), it may contain the tunnel endpoint identifier as the main information. The IP address may be hidden deep inside the packet. Once a downlink packet is received (e.g. from the Internet), it may contain the IP address, and the tunnel endpoint identifier may need to be looked up by using a hash table. This lookup work may be performed by the worker threads. Thus, when deciding which worker thread gets the packet, the RX thread may you use the IP address as the criterion for downlink packets (as TEID may not be known yet), and use the TEID as the criterion for uplink packets (RX thread has not inspected the packet to know the the IP address). Thus, different criterion for different directions (i.e. uplink and downlink) may be used by the one or more RX threads, and therefore, different worker thread may get the packet.

It is further noted that the worker threads 226, 228 may be bound to Central Processing Unit (CPU) cores. Similarly, the RX and TX threads 224, 230 may be bound to CPU cores. The control interface threads (e.g. threads 216-218) may freely (i.e. unbound) run on CPU cores.

Figure 8:
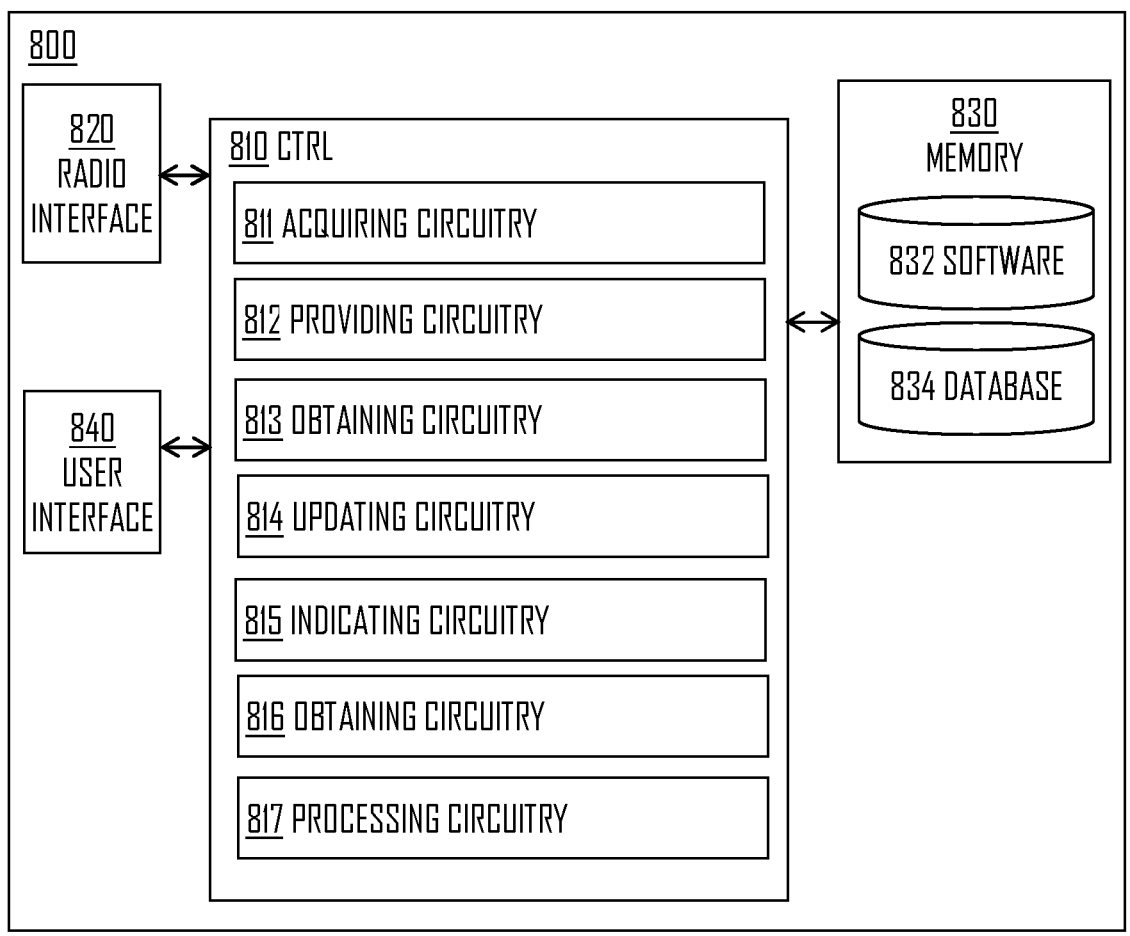
FIG. 8 illustrates a block diagram of an apparatus according to an embodiment.

FIG. 8 provides an apparatus 800 comprising a control circuitry (CTRL) 810 such as at least one processor, and at least one memory 830 including a computer program code (software) 832, wherein the at least one memory and the computer program code (software) 832, are configured, with the at least one processor, to cause the respective apparatus 800 to carry out or cause any one of the embodiments or operations thereof. That is, the apparatus 800 may, for example, cause the method indicated in FIG. 3 to be performed.

Referring to FIG. 8, the memory 830 may be implemented using any suitable data storage technology, such as semiconductor based memory devices, flash memory, magnetic memory devices and systems, optical memory devices and systems, fixed memory and removable memory. The memory 830 may comprise a database 834 for storing data.

The apparatus 800 may further comprise radio interface (TRX) 820 comprising hardware and/or software for realizing communication connectivity according to one or more communication protocols. The TRX may provide the apparatus with communication capabilities to access the radio access network or some other wireless network, for example. The TRX may comprise standard well-known components such as an amplifier, filter, frequency-converter, (de)modulator, and encoder/decoder circuitries and one or more antennas.

The apparatus 800 may comprise user interface 840 comprising, for example, at least one keypad, a microphone, a touch display, a display, a speaker, etc. The user interface 840 may be used to control the respective apparatus by a user of the apparatus 840.

In an embodiment, the apparatus 800 may be or be comprised in a network device, such as a network node or access point, for example. The apparatus 800 may be the network element 102, for example. In an embodiment, the apparatus 800 is comprised in the network element 102 or in some other network element. Further, the apparatus 800 may comprise one or more of the elements indicated in FIGS. 2, 7A, and 7B. That is, the apparatus 800 may comprise the control interface part 210 elements and/or user plane 220 elements. Hence, the apparatus 800 may comprise or implement the threads 224-230, the interfaces 222, 232, the socket 212, the controller 214, the threads 216, 218, the thread 217 and/or the pipe 219. It needs to be noted that the apparatus 800 may comprise physical resources (e.g. processors, cores, memory, network interfaces) which implement the control interface part 210 and user plane 220 elements on virtual resources. It is further noted that the apparatus 800 may be shared between a plurality of physically separated entities that provide the system described above with numerous examples. That is, the different operational entities (e.g. FIG. 2, 7A, 7B) may be comprised and/or provided by a plurality of physical entities. The virtualization, in general, means that location of actual computing becomes less relevant for the performance of the system. Therefore, the actual functions of the described system may be realized by physical entities. However, logically the virtual entities may operate similarly as physical entities.

Still referring to FIG. 8, according to an embodiment, the control circuitry 810 comprises an acquiring circuitry 811 configured to cause acquiring, by a controller of a control interface part, a control plane message requesting an update of a processing thread-specific hash table of a user plane processing thread; a providing circuitry 812 configured to cause providing, by the controller, the control plane message to a queue of the user plane processing thread; an obtaining circuitry 813 configured to cause obtaining, by the user plane processing thread, the control plane message from the queue; an updating circuitry 814 configured to cause updating, by the user plane processing thread based on the obtained control plane message, the processing thread-specific hash table of the user plane processing thread; an indicating circuitry 815 configured to cause indicating, by the user plane processing thread, to the controller of the control interface part that the requested update is processed in response to the updating; an obtaining circuitry 816 configured to cause obtaining, by the user plane processing thread, at least one user plane message from the queue of the user plane processing thread; and a processing circuitry 817 configured to cause processing, by the user plane processing thread, the at least one user plane message based at least partly on the processing thread-specific hash table. The causing may mean that the respective apparatus causes the different elements of the system (e.g. system of FIG. 2, 7A, 7B) to perform the described actions. For example, causing may mean that the apparatus generates said system (e.g. virtual system) on physical resources that have been allocated to the apparatus 800.

In an embodiment of FIG. 8, at least some of the functionalities of the apparatus 800 (e.g. the network element 102) may be shared between two physically separate devices, forming one operational entity. Therefore, the apparatus may be considered to depict the operational entity comprising one or more physically separate devices for executing at least some of the above-described processes. Thus, the apparatus of FIG. 8, utilizing such a shared architecture, may comprise a remote control unit (RCU), such as a host computer or a server computer, operatively coupled (e.g. via a wireless or wired network) to a remote radio head (RRH) located at a base station site. In an embodiment, at least some of the described processes may be performed by the RCU. In an embodiment, the execution of at least some of the described processes may be shared among the RRH and the RCU. The radio interface 820 may provide the RCU with the connection to the RRH. The RRH may then comprise radio frequency signal processing circuitries and antennas, for example.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device. In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

The present solution may be especially suitable for system utilizing NFV. That is, NFV requires software-based implementations and thus may make, for example, application specific integrated circuit (ASIC) based implementations less desirable or even impossible. Hence, the described solution, being especially suitable for software implementation, may be very useful in communication systems utilizing NFV.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 7B may be carried out by an apparatus comprising corresponding means for carrying out at least some of the described processes. Some example means for carrying out the processes may include at least one of the following: detector, processor (including single core, dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 7B or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 2 to 7B, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 7B may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
  acquiring, by a controller of a control interface part, a control plane message requesting an update of a processing thread-specific hash table of a user plane processing thread;
  providing, by the controller, the control plane message to a queue of the user plane processing thread;
  obtaining, by the user plane processing thread, the control plane message from the queue;
  updating, by the user plane processing thread based on the obtained control plane message, the processing thread-specific hash table of the user plane processing thread;
  indicating, by the user plane processing thread, to the controller that the requested update is processed in response to the updating;
  obtaining, by the user plane processing thread, at least one user plane message from the queue of the user plane processing thread; and
  processing, by the user plane processing thread, the at least one user plane message based at least partly on the processing thread-specific hash table.

2. The method of claim 1, further comprising:
  locking, by the user plane processing thread, said queue;
  obtaining, by the user plane processing thread, the at least one user plane message during said queue being locked; and
  releasing, by the user plane processing thread, said queue in response to the obtaining of the at least one user plane message.

3. The method of claim 1, wherein the at least one user plane message denotes a plurality of user plane messages.

4. The method of claim 1, wherein user plane messages have a lower priority compared with control plane messages in the queue of the user plane processing thread.

5. The method of claim 1, wherein the user plane processing thread is an uplink processing thread processing only uplink user plane messages.

6. The method of claim 1, wherein the user plane processing thread is a downlink processing thread processing only downlink user plane messages.

7. The method of claim 1, wherein the user plane comprises a plurality of processing threads, each processing thread associated with a processing thread-specific hash table.

8. The method of claim 1, wherein the controller acquires the control plane message from a socket of the control interface part, the method further comprising:
  providing, by the user plane processing thread to the controller, the response message indicating that the update, requested by the control plane message, is processed, the response message provided via a pipe or a second socket of the control interface part, wherein the pipe and the sockets support multiplexing.

9. The method of claim 1, further comprising:
  providing, by the user plane processing thread, the response message to a queue of the controller, the response message indicating that the update requested by the control plane message is processed; and acquiring, by the controller, the response message from said queue.

10. The method of claim 1, wherein the controller comprises an input processing thread and an output processing thread.

11. The method of claim 1, wherein said user plane processing thread is one of a plurality of worker processing threads of the user plane, the method further comprising:

obtaining, by a receiver processing thread of the user plane, a user plane message; and providing, by the receiver processing thread, said user plane message to a queue of at least one target worker processing thread of the plurality of worker processing threads.

12. The method of claim 11, further comprising:

determining, by the receiver processing thread, whether said user plane message is an address resolution protocol, ARP, message or some other message;

in the case of the ARP message, providing, by the receiver processing thread, the ARP message to a queue of each of the plurality of worker processing threads, otherwise, providing, by the receiver processing thread, said message only to a queue of a target worker processing thread.

13. A computer program product embodied on a non-transitory computer-readable medium and comprising a computer program code readable by a computer, wherein the computer program code configures the computer to carry out the method according to claim 1 when read by the computer.

14. An apparatus comprising:

at least one processor, and at least one non-transitory memory comprising a computer program code, wherein the at least one memory and the computer program code are configured, with the at least one processor, to cause the apparatus to perform operations comprising:

cause acquiring, by a controller of a control interface part, a control plane message requesting an update of a processing thread-specific hash table of a user plane processing thread;

cause providing, by the controller, the control plane message to a queue of the user plane processing thread;

cause obtaining, by the user plane processing thread, the control plane message from the queue;

cause updating, by the user plane processing thread based on the obtained control plane message, the processing thread-specific hash table of the user plane processing thread;

cause indicating, by the user plane processing thread, to the controller that the requested update is processed in response to the updating;

cause obtaining, by the user plane processing thread, at least one user plane message from the queue of the user plane processing thread; and cause processing, by the user plane processing thread, the at least one user plane message based at least partly on the processing thread-specific hash table.

15. The apparatus of claim 14, wherein the at least one memory and the computer program code are configured, with the at least one processor, to cause the apparatus further to perform operations comprising:

cause locking, by the user plane processing thread, said queue;

cause obtaining, by the user plane processing thread, the at least one user plane message during said queue being locked; and cause releasing, by the user plane processing thread, said queue in response to the obtaining of the at least one user plane message.

16. The apparatus of 13, wherein the at least one user plane message denotes a plurality of user plane messages, wherein user plane messages have a lower priority compared with control plane messages in the queue of the user plane processing thread, and wherein the user plane processing thread is an uplink processing thread processing only uplink user plane messages.

17. The apparatus of claim 14, wherein the user plane comprises a plurality of processing threads, each processing thread associated with a processing thread-specific hash table.

18. The apparatus of claim 14, wherein the controller acquires the control plane message from a socket of the control interface part, wherein the at least one memory and the computer program code are configured, with the at least one processor, to cause the apparatus further to perform operations comprising:

cause providing, by the user plane processing thread to the controller, the response message indicating that the update, requested by the control plane message, is processed, the response message provided via a pipe or a second socket of the control interface part, wherein the pipe and the sockets support multiplexing.

19. The apparatus of claim 14, wherein the at least one memory and the computer program code are configured, with the at least one processor, to cause the apparatus further to perform operations comprising:

cause providing, by the user plane processing thread, the response message to a queue of the controller, the response message indicating that the update requested by the control plane message is processed; and acquiring, by the controller, the response message from said queue, and wherein the controller comprises an input processing thread and an output processing thread.

20. The apparatus of claim 14, wherein said user plane processing thread is one of a plurality of worker processing threads of the user plane, wherein the at least one memory and the computer program code are configured, with the at least one processor, to cause the apparatus further to perform operations comprising:

cause obtaining, by a receiver processing thread of the user plane, a user plane message; and cause providing, by the receiver processing thread, said user plane message to a queue of at least one target worker processing thread of the plurality of worker processing threads, and wherein the at least one memory and the computer program code are configured, with the at least one processor, to cause the apparatus further to perform operations comprising:

cause determining, by the receiver processing thread, whether said user plane message is an address resolution protocol, ARP, message or some other message;

in the case of the ARP message, cause providing, by the receiver processing thread, the ARP message to a queue of each of the plurality of worker processing threads, otherwise, cause providing, by the receiver processing thread, said message only to a queue of a target worker processing thread.

\* \* \* \* \*